(12) United States Patent
Tanaka et al.

(10) Patent No.: US 9,466,291 B2
(45) Date of Patent: Oct. 11, 2016

(54) VOICE RETRIEVAL DEVICE AND VOICE RETRIEVAL METHOD FOR DETECTING RETRIEVAL WORD FROM VOICE DATA

(71) Applicant: FUJITSU LIMITED, Kawasaki-shi, Kanagawa (JP)

(72) Inventors: Masakiyo Tanaka, Hachioji (JP); Hitoshi Iwamida, Kawasaki (JP); Nobuyuki Washio, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/515,882

(22) Filed: Oct. 16, 2014

(65) Prior Publication Data
US 2015/0112681 A1 Apr. 23, 2015

(30) Foreign Application Priority Data
Oct. 21, 2013 (JP) ................................. 2013-218422

(51) Int. Cl.
G10L 15/00 (2013.01)
G10L 15/08 (2006.01)
G10L 15/32 (2013.01)

(52) U.S. Cl.
CPC ............... *G10L 15/08* (2013.01); *G10L 15/32* (2013.01); *G10L 2015/088* (2013.01)

(58) Field of Classification Search
CPC ... C10L 15/22; C10L 15/08; C10L 2015/088
USPC ...................... 704/251, 270.1, 275
See application file for complete search history.

(56) References Cited

U.S. PATENT DOCUMENTS

| 7,076,427 | B2 * | 7/2006 | Scarano | H04M 3/2281 |
| | | | | 379/265.06 |
| 7,117,159 | B1 * | 10/2006 | Packingham | G10L 13/00 |
| | | | | 379/88.02 |
| 2002/0136561 | A1 | 9/2002 | Izumi et al. | |
| 2002/0147592 | A1 * | 10/2002 | Wilmot | G06F 17/3061 |
| | | | | 704/270.1 |
| 2007/0043566 | A1 * | 2/2007 | Chestnut | G10L 15/075 |
| | | | | 704/257 |
| 2009/0150152 | A1 * | 6/2009 | Wasserblat | G06F 17/30746 |
| | | | | 704/254 |

(Continued)

FOREIGN PATENT DOCUMENTS

JP 62-206597 9/1987
JP 5-75119 10/1993

(Continued)

*Primary Examiner* — Shaun Roberts
(74) *Attorney, Agent, or Firm* — Staas & Halsey LLP (57) ABSTRACT

A voice retrieval device includes a processor; and a memory which stores a plurality of instructions, which when executed by the processor, cause the processor to execute: setting detection criteria for a retrieval word, based on a characteristic of the retrieval word, such that the higher the detection accuracy of the retrieval word or the lower the pronunciation difficulty of the retrieval word or the lower the appearance probability of the retrieval word, the stricter the detection criteria; performing first voice retrieval processing on voice data according to the detection criteria and detecting a section that possibly includes the retrieval word as a candidate section from the voice data; and performing second voice retrieval processing different from the first voice retrieval processing on each candidate section and determining whether or not the retrieval word is included in each candidate section.

18 Claims, 6 Drawing Sheets

(56) References Cited

U.S. PATENT DOCUMENTS

| | | | | |
|---|---|---|---|---|
| 2010/0161335 A1* | 6/2010 | Whynot | ................. | G10L 15/22 |
| | | | | 704/254 |
| 2012/0239394 A1* | 9/2012 | Matsumoto | ............ | G10L 25/84 |
| | | | | 704/233 |
| 2012/0239402 A1* | 9/2012 | Washio | ................. | G10L 15/02 |
| | | | | 704/251 |
| 2014/0025379 A1* | 1/2014 | Ganapathiraju | ........ | G10L 15/08 |
| | | | | 704/255 |
| 2014/0142943 A1* | 5/2014 | Ishikawa | ................ | G10L 25/66 |
| | | | | 704/249 |
| 2014/0247926 A1* | 9/2014 | Gainsboro | .......... | H04M 3/2281 |
| | | | | 379/88.01 |
| 2014/0310000 A1* | 10/2014 | Cardillo | .............. | H04M 3/4936 |
| | | | | 704/270.1 |

FOREIGN PATENT DOCUMENTS

| | | |
|---|---|---|
| JP | 06-266393 | 9/1994 |
| JP | 2000-099089 | 4/2000 |
| JP | 2002-278259 | 9/2002 |
| JP | 2002-278579 | 9/2002 |
| JP | 2004-037813 | 2/2004 |

* cited by examiner

VOICE RETRIEVAL DEVICE AND VOICE RETRIEVAL METHOD FOR DETECTING RETRIEVAL WORD FROM VOICE DATA

CROSS-REFERENCE TO RELATED APPLICATION

This application is based upon and claims the benefit of priority of the prior Japanese Patent Application No. 2013-218422, filed on Oct. 21, 2013, the entire contents of which are incorporated herein by reference.

FIELD

The embodiments discussed herein are related to a voice retrieval device and a voice retrieval method for detecting a retrieval word from voice data, for example.

BACKGROUND

There has been a research for a technology to detect a specific retrieval word to extract a part related to desired contents from voice data obtained by recording telephone calls or recording voices in lectures or conferences. In such a voice retrieval technology, there has been proposed a technology to speed up retrieval processing (see, for example, Japanese Laid-open Patent Publication No. 2002-278579). A voice data retrieval device disclosed in Japanese Laid-open Patent Publication No. 2002-278579, for example, converts voice waveform data into a voice symbol string and detects a section that matches with a voice symbol of a retrieval word in the voice symbol string. Then, the voice data retrieval device uses the voice waveform data in the detected section to determine whether or not the retrieval word is included in the section.

SUMMARY

In accordance with an aspect of the embodiments, a voice retrieval device includes a processor; and a memory which stores a plurality of instructions, which when executed by the processor, cause the processor to execute: setting detection criteria for a retrieval word, based on a characteristic of the retrieval word, such that the higher the detection accuracy of the retrieval word or the lower the pronunciation difficulty of the retrieval word or the lower the appearance probability of the retrieval word, the stricter the detection criteria; performing first voice retrieval processing on voice data according to the detection criteria and detecting a section that possibly includes the retrieval word as a candidate section from the voice data; and performing second voice retrieval processing different from the first voice retrieval processing on each candidate section and determining whether or not the retrieval word is included in each candidate section.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Hereinafter, with reference to the drawings, voice retrieval devices according to various embodiments are described.

The voice retrieval device performs simple voice retrieval processing (first voice retrieval processing) having relatively low throughput despite relatively low detection accuracy to detect a candidate section, which possibly includes a retrieval word to be retrieved, from voice data. Then, the voice retrieval device applies precise voice retrieval processing (second voice retrieval processing) having relatively high detection accuracy despite relatively high throughput to determine whether or not the retrieval word is included in the candidate section. Here, the voice retrieval device configures the settings, based on a characteristic of the retrieval word itself, such that detection criteria for the candidate section by the simple voice retrieval processing become stricter, that is, the candidate section is less likely to be detected for a retrieval word with higher retrieval accuracy or a lower probability of appearance. On the other hand, the voice retrieval device configures the settings such that the detection criteria for the candidate section become laxer, that is, the candidate section is more likely to be detected for a retrieval word with lower retrieval accuracy or a higher probability of appearance. Accordingly, the voice retrieval device reduces the throughput which may be desired to detect the retrieval word included in the voice data while suppressing reduction in detection accuracy for the retrieval word.

In this embodiment, the voice retrieval device is incorporated in a telephone set, and detects a section including a retrieval word specified by a user from voice data acquired over telephone lines, voice data collected with a microphone or the voice data stored in a memory.

However, the voice retrieval device is not limited to the one incorporated in the telephone set, but may be mounted in various devices handling voice data, for example, an IC recorder or a computer.

Figure 1:
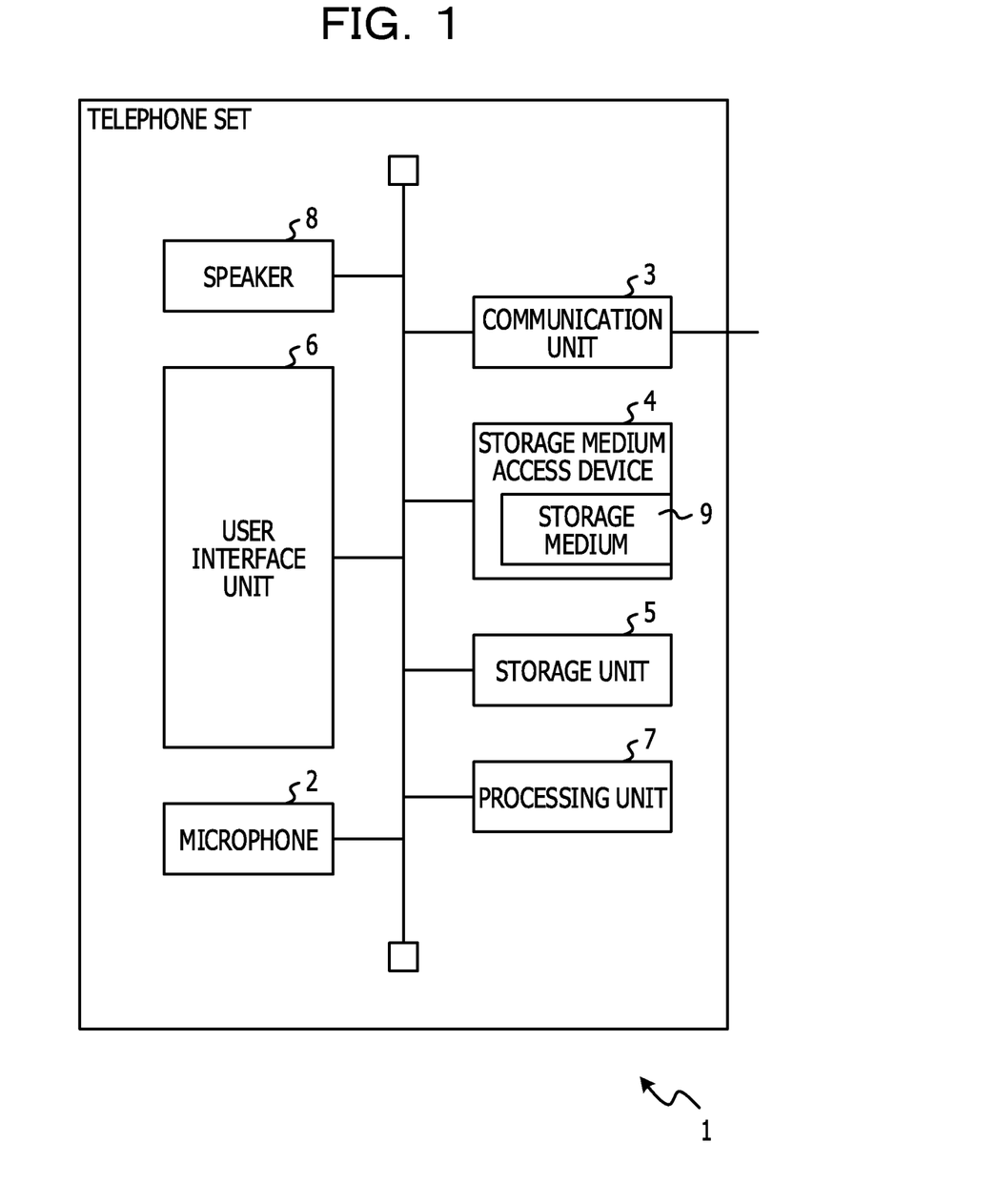
FIG. 1 is a schematic configuration diagram of a telephone set equipped with a voice retrieval device according to a first embodiment.

FIG. 1 is a schematic configuration diagram of a telephone set equipped with a voice retrieval device according to a first embodiment. In this embodiment, a telephone set 1 includes a microphone 2, a communication unit 3, a storage medium access device 4, a storage unit 5, a user interface unit 6, a processing unit 7 and a speaker 8. Note that the telephone set 1 may be either a fixed-line telephone or a mobile phone.

The microphone 2 is an example of a voice input unit, and acquires data of a voice emitted by a user that is one speaker.

The microphone 2 generates an analog voice signal by collecting the voice emitted by the user around the microphone 2, and outputs the analog voice signal to an analog-digital converter (not illustrated). The analog-digital converter samples the analog voice signal with a predetermined sampling period for digitalization, and thus generates uplink voice data. Then, the analog-digital converter outputs the uplink voice data to the processing unit 7 connected to the analog-digital converter.

The communication unit 3 is another example of the voice input unit, and has an interface circuit to connect the telephone set 1 to a telephone line. The communication unit 3 receives a data stream through the telephone line, the data stream containing downlink voice data obtained by converting voice emitted by the other speaker into an electric signal. Then, the communication unit 3 extracts the downlink voice data from the data stream. Note that, when the downlink voice data is coded by a predetermined channel coding method, the communication unit 3 decodes the coded downlink voice data according to the channel coding method. Thereafter, the communication unit 3 outputs the downlink voice data to the processing unit 7.

The storage medium access device 4 is a device configured to access a storage medium 9 such as a semiconductor memory card, for example. The storage medium access device 4 reads a computer program, which is stored in the storage medium 9 and to be executed on the processing unit 7, for example, and hands over the computer program to the processing unit 7. Alternatively, the storage medium access device 4 may read a voice retrieval computer program from the storage medium 9 and hand over the voice retrieval computer program to the processing unit 7.

The storage unit 5 includes a readable and writable non-volatile semiconductor memory and a readable and writable volatile semiconductor memory, for example. The storage unit 5 stores various application programs to be executed on the processing unit 7 and various data. Also, the storage unit 5 may store a computer program to execute voice retrieval processing and various data to be used for the voice retrieval processing. Furthermore, the storage unit 5 may store voice data acquired through the microphone 2 or the communication unit 3.

The user interface unit 6 is an example of an input unit, and includes an input unit such as a number of operation keys and a display unit such as a liquid crystal display, for example. Alternatively, the user interface unit 6 may include a unit that is integrated combination of the input unit and the display unit, such as a touch panel display. The user interface unit 6 generates an operation signal corresponding to an operation of the input unit by the user, and outputs the operation signal to the processing unit 7. Also, the user interface unit 6 displays various information received from the processing unit 7 on the display unit. Furthermore, the user may input a retrieval word he/she wishes to detect from voice data through the user interface unit 6, for example, as text data.

The processing unit 7 includes one or more processors, a memory circuit and a peripheral circuit. The processing unit 7 is connected to the respective units in the telephone set 1 through a signal line, and controls the respective units in the telephone set 1. Also, the processing unit 7 performs call setting in response to an operation by the user or receipt of a call signal, and executes various kinds of processing to maintain communication. Moreover, the processing unit 7 executes various kinds of processing to transmit the uplink voice data received from the microphone 2 to the telephone line through the communication unit 3 as well as various kinds of processing to reproduce the downlink voice data received from the telephone line through the speaker 8.

Furthermore, the processing unit 7 is an example of the voice retrieval device, and detects a section including a retrieval word from at least one of the uplink voice data and the downlink voice data. In the following description, it is assumed that voice data from which a retrieval word is to be detected is the downlink voice data including the voice of the other speaker. Note that the voice data from which the retrieval word is to be detected may be the uplink voice data including the voice of the user or may be one voice data obtained by combining the uplink voice data and the downlink voice data.

Figure 2:
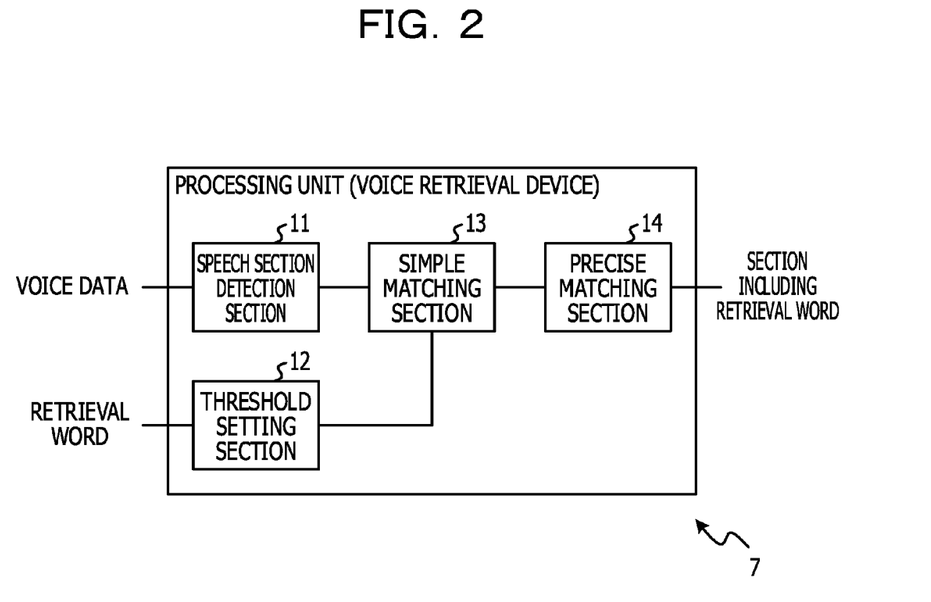
FIG. 2 is a functional block diagram of a processing unit included in the telephone set equipped with the voice retrieval device according to the first embodiment.

FIG. 2 is a functional block diagram of the processing unit 7 for the voice retrieval processing. The processing unit 7 includes a speech section detection section 11, a threshold setting section 12, a simple matching section 13 and a precise matching section 14.

The respective sections included in the processing unit 7 are function modules realized by a computer program operated on the processor included in the processing unit 7, for example. Alternatively, the respective sections included in the processing unit 7 may be implemented as separate circuits in the telephone set 1 or may be implemented separately from the processing unit 7 in the telephone set 1, as one integrated circuit that realizes the functions of the respective sections.

The speech section detection section 11 divides voice data into frames each having a predetermined length. The length of the frame is set to 10 msec to 100 msec, for example. The speech section detection section 11 detects a speech section that is a section in which the speaker speaks by detecting a frame in which the speaker emits his/her voice among the frames of the voice data.

Generally, power of uplink voice data in the frame in which the speaker emits his/her voice is larger than that of voice data in a frame in which the speaker emits no voice. The speech section detection section 11 transforms the voice data into a spectral signal from a time domain to a frequency domain by performing time-frequency transform. Note that, as the time-frequency transform, the speech section detection section 11 may perform Fast Fourier Transform (FFT) or Modified Discrete Cosign Transform (MDCT), for example. Then, the speech section detection section 11 obtains power for each frequency band by squaring the spectral signal in each frequency band, and calculates the average value of the power over the entire frequency band. Thereafter, the speech section detection section 11 detects a frame having the average value larger than a predetermined power threshold, as the frame in which the speaker emits his/her voice. The power threshold is set to a value obtained by adding a predetermined offset to background noise power, for example. The background noise power may be preset, for example, or may be updated for each frame. For example, the speech section detection section 11 updates the background noise power by adding a value obtained by multiplying the power average value of the frame having the power average value not more than the power threshold by a forgetting factor $\alpha$ (for example, $\alpha=0.01$) to a value obtained by multiplying the background noise power at the point by $(1-\alpha)$.

Note that the speech section detection section 11 may determine whether or not each frame is the frame in which the speaker emits his/her voice, according to another method for detecting a speech section. For example, the speech section detection section 11 may obtain a maximum value (except a peak value at a time difference 0) among peak values of an autocorrelation function or a modified autocorrelation function, for the frame having the power average value larger than the power threshold. While the degree of autocorrelation is relatively high for the frame corresponding to human voice, the degree of autocorrelation is low for the frame corresponding to background noise. Therefore, the speech section detection section 11 may determine a frame having the maximum value of peak value larger than a predetermined threshold, as the frame in which the speaker emits his/her voice. Note that the autocorrelation function is obtained by computing the inverse Fourier transform of the power (power spectral density) of each frequency band. Also, the modified autocorrelation function is obtained by computing the inverse Fourier transform of the power spectral density subjected to filtering using a linear predictive coding filter.

The speech section detection section 11 detects a sound section from the voice data, the sound section having a sequence of frames determined as the frames in which the speaker emits his/her voice. Then, the speech section detection section 11 sets the sound section as one speech section every time the sound section is detected.

Every time a speech section is detected, the speech section detection section 11 notifies the simple matching section 13 of a start time and an end time of the speech section.

The threshold setting section 12 is an example of a detection criteria setting unit, and performs a setting, based on a characteristic of a retrieval word specified through the user interface unit 6, such that detection criteria for a candidate section by the simple matching section 13 become stricter, that is, the candidate section is less likely to be detected for a retrieval word with higher retrieval accuracy. In this embodiment, the threshold setting section 12 sets a smaller rank threshold for the retrieval word with higher retrieval accuracy. Specifically, the rank threshold is calculated by the simple matching section 13 and represents the number of candidate sections to be detected by the simple matching section 13. The threshold is an example of candidate section detection criteria.

In this embodiment, the threshold setting section 12 determines the rank threshold by focusing on the number of moras contained in a retrieval word as the characteristic of the retrieval word. Note that the mora is a sound segment unit having a certain temporal length. When a word is written in Japanese kana characters, for example, each kana character except contracted sounds (small ya, yu and yo) is one mora.

Figure 3:
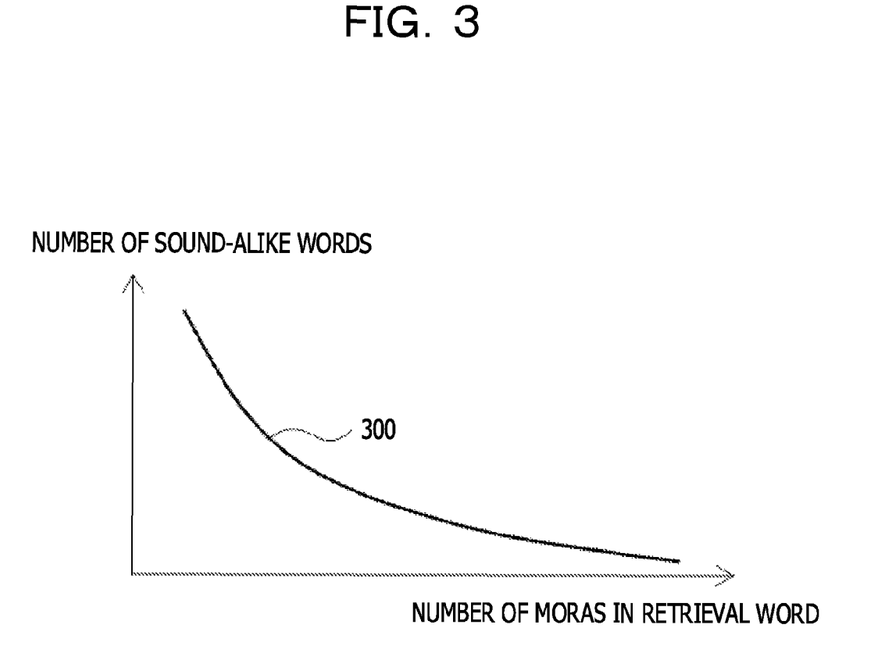
FIG. 3 is a graph illustrating a relationship between the number of moras in a retrieval word and the number of sound-alike words.

FIG. 3 is a graph illustrating a relationship between the number of moras contained in a word and the number of words that sound similar to that word. In FIG. 3, the horizontal axis represents the number of moras and the vertical axis represents the number of words. A graph 300 indicates a relationship between the number of moras contained in a word and the number of words that sound similar to that word. As shown in the graph 300, generally, the smaller the number of moras contained in a word, the larger the number of words that sound similar to that word. On the other hand, the larger the number of moras contained in a word, the smaller the number of words that sound similar to that word. Therefore, when the number of words that sound similar to a retrieval word is large, the number of spots that sound similar to the retrieval word among voice data may be increased. On the other hand, when the number of words that sound similar to a retrieval word is small, the number of spots that sound similar to the retrieval word among voice data tends to be decreased. In other words, it is estimated that the larger the number of moras contained in a retrieval word, the higher the detection accuracy.

Therefore, in this embodiment, the threshold setting section 12 lowers the rank threshold for a retrieval word containing a larger number of moras. In order to do this, the threshold setting section 12 refers to a mora number database prestored in the storage unit 5, for example. Specifically, in the mora number database, text data of each of words and the number of moras contained in the word are recorded for each word. Then, the threshold setting section 12 detects a word that matches with text data of a retrieval word specified through the user interface unit 6 from among the words registered in the mora number database. Thereafter, the threshold setting section 12 sets the number of moras corresponding to the detected word as the number of moras of the retrieval word. Meanwhile, when the retrieval word includes more than one word, the threshold setting section 12 detects each of the words included in the retrieval word from among the words registered in the mora number database. Then, the threshold setting section 12 may set the sum of the numbers of moras corresponding to the respective words detected as the number of moras of the retrieval word.

Alternatively, the threshold setting section 12 may conduct a language analysis on a retrieval word to calculate the number of moras contained in the retrieval word. In this case, for example, the threshold setting section 12 conducts a morphological analysis that is a type of the language analysis on text data of the retrieval word by referring to a word dictionary describing pronunciations of words, which is prestored in the storage unit 5. Thus, the threshold setting section 12 specifies each of syllables included in the retrieval word. Accordingly, the threshold setting section 12 may obtain the number of moras in the retrieval word. The threshold setting section 12 may adopt a method using dynamic programming, for example, as the morphological analysis.

The threshold setting section 12 sets a rank threshold $n_k$ according to the following equation.

$$n_k = N \times f_{mora}(k) \quad (1)$$

Here, k is the number of moras. N is a constant, which is set to a large value if target voice data is long. For example, N is set to a value equal to 1/10 of the total number of words included in the target voice data. If, for example, the average value of the length of one word is 0.75 second, the target voice data is 100 minutes, and speech time is 50% of the total, it is estimated that the target data includes about 4000 words. Therefore, N is set to 400. $f_{mora}(k)$ is a monotonically decreasing function to output a small value if the number of moras k is large and to set the output value within a range of 0 to 1. $f_{mora}(k)$ is expressed as the following equations. However, $f_{mora}(k)$ may be a non-linear monotonically decreasing function such as a quadratic function, a cubic function or an exponential function.

$$f_{mora}(k) = 0.5 \quad \text{if } k > 6 \quad (2)$$
$$f_{mora}(k) = 1.0 \quad \text{else if } k < 3$$
$$f_{mora}(k) = \frac{9-k}{6} \quad \text{else if } 3 \leq k \leq 6$$

Alternatively, the threshold setting section 12 may calculate the rank threshold $n_k$ by subtracting a value obtained by a monotonically increasing function, in which the larger the number of moras k, the larger the output value, from the constant N.

The threshold setting section 12 notifies the simple matching section 13 of the rank threshold $n_k$.

The simple matching section 13 performs simple voice retrieval processing having throughput lower than that of precise voice retrieval processing by the precise matching section 14 to detect a candidate section, which possibly includes a retrieval word, from the speech sections in the voice data.

In this embodiment, the simple matching section 13 obtains a syllable string of the retrieval word, and calculates an edit distance between the syllable string of the retrieval word and a maximum likelihood syllable string of each of the speech sections in the voice data. Then, the simple matching section 13 calculates a simple matching score that increases with the smaller edit distance, and detects a section that has a rank equal to or lower than the rank threshold $n_k$ as the candidate section, sequentially from the section having a higher simple matching score. Note that the maximum likelihood syllable string of the speech section is text data generated by obtaining syllables that are acoustically most alike sequentially from the first speech section in chronological order and then arranging the syllables in chronological order. The processing unit 7 may obtain the maximum likelihood syllable string before execution of voice retrieval processing on the entire voice data to be targeted for retrieval.

The simple matching section 13 conducts a language analysis on the retrieval word, for example, to obtain the syllable string of the retrieval word. For example, the simple matching section 13 conducts a morphological analysis that is a type of the language analysis on text data of the retrieval word by referring to a word dictionary describing pronunciations of words, which is prestored in the storage unit 5. Thus, the simple matching section 13 obtains the syllable string of the retrieval word by specifying each of the syllables included in the retrieval word.

Moreover, the simple matching section 13 adopts dynamic programming, for example, to calculate the edit distance between the syllable string of the retrieval word and the maximum likelihood syllable string of the speech section. Note that the maximum likelihood syllable string of the speech section may be longer than the syllable string of the retrieval word. In this case, the simple matching section 13 sets sections having the same length as that of the syllable string of the retrieval word by shifting the syllables one by one in the maximum likelihood syllable string of the speech section, and then calculates an edit distance for each of the sections. With the dynamic programming, assuming that the number of syllables included in the maximum likelihood syllable string of the speech section is m and the number of syllables included in the syllable string of the retrieval word is n, the calculation amount for calculating the edit distance is suppressed to about o (mn).

Note that the edit distance is a scale obtained by quantifying a difference between two character strings. The edit distance is equivalent to the minimum number of edit operations, such as insertion, replacement and deletion of characters with respect to one of the character strings, which may be desired to make one of the character strings match the other character string by performing the edit operations. In the case of replacing a Japanese character string "Toukyoku" with a Japanese character string "Koukyo", for example, the following two edit operations may be performed.

(1) Replace "To" with "Ko" (Toukyoku)→(Koukyoku)
(2) Delete "ku" (Koukyoku)→(Koukyo)
Therefore, the edit distance is 2.

Note that since the replacement includes two edit operations, deletion and insertion, the simple matching section 13 may calculate the edit distance by assuming that one replacement is equivalent to two edit operations. Also, in execution of the replacement operation, the simple matching section 13 may set the number of edit operations between 1 and 2, for example, 1.5 when replacing a syllable to be replaced with a syllable that is acoustically similar to the syllable to be replaced. Note that when two syllables have the same consonant or vowel, the simple matching section 13 may determine that the two syllables are acoustically alike.

Note that the simple matching section 13 may calculate the edit distance by the phoneme instead of calculating the edit distance by the syllable.

For each of the sections having the edit distance calculated, the simple matching section 13 calculates a simple matching score S for the section by substituting the edit distance of the section into the following equation.

$$S = 100 - 100 \times \left(\frac{d}{l}\right) \quad (3)$$

Here, d is the edit distance, and l is the length of the syllable string of the retrieval word (that is, the number of syllables included in the syllable string of the retrieval word). As is clear from the equation (3), the smaller the edit distance, the higher the simple matching score S, whose maximum value is 100. The higher the simple matching score S, the higher the possibility of the syllable string of the corresponding section matching the retrieval word.

The simple matching section 13 sets a section that has a rank equal to or lower than the rank threshold $n_k$ as the candidate section that possibly includes the retrieval word, sequentially from the section having a higher simple matching score. Then, the simple matching section 13 notifies the precise matching section 14 of a start time and an end time of each candidate section.

The precise matching section 14 applies precise voice retrieval processing having high detection accuracy despite the throughput relatively higher than the simple voice retrieval processing by the simple matching section 13, thereby determining whether or not the retrieval word is included in the candidate section.

In this embodiment, the precise matching section 14 uses an acoustic model created beforehand to determine whether or not the retrieval word is included in the candidate section. Note that the acoustic model is stored in the storage unit 5 beforehand.

The acoustic model is generated by dividing the pronunciation of the word into unit sounds such as phonemes or syllables, for example, and connecting unit acoustic models corresponding to the unit sounds according to the order of the unit sounds. The unit acoustic model and the acoustic model are expressed by a Hidden Markov Model (HMM), respectively, for example.

The precise matching section 14 extracts a characteristic amount used for voice recognition from the candidate section, for example. In order to do this, the precise matching section 14 obtains a Mel Frequency Cepstral Coefficient (MFCC) as the characteristic amount, for example. Alternatively, the precise matching section 14 obtains a power difference value between consecutive frames included in the candidate section. In the case of calculating the MFCC as the characteristic amount, the precise matching section 14 converts a power spectrum of each frequency, for example, into a power value by Mel scale and then performs frequency transform such as the MDCT on the logarithm of the power value, thereby calculating the MFCC. Meanwhile, in the case of obtaining the power difference value between the frames as the characteristic amount, the precise matching section 14 obtains a difference in integrated value of the power spectrum over the entire frequency band between two consecutive frames, for example, thereby obtaining the difference value.

Note that the precise matching section 14 may extract any of various other characteristic amounts (for example, a basic frequency) which are used for voice recognition using the acoustic model, as the characteristic amount. Moreover, the precise matching section 14 may extract several kinds of characteristic amounts from the candidate section.

The precise matching section 14 obtains the similarity between the characteristic amount sequence, in which one or more characteristic amounts extracted from the candidate section are arranged in chronological order, and the acoustic model of the retrieval word, which is generated by connecting the HMMs representing the unit acoustic models. Then, when the similarity is equal to or higher than a predetermined threshold, the precise matching section 14 determines that the retrieval word is included in the candidate section. Thereafter, the precise matching section 14 stores information indicating the candidate section determined to include the retrieval word, for example, a start time and an end time of the candidate section in the storage unit 5. Alternatively, the precise matching section 14 may output the information indicating the candidate section determined to include the retrieval word to the user interface unit 6.

Note that the precise matching section 14 may determine whether or not the retrieval word is included in the candidate section, according to another voice recognition method such as a dynamic time warping method.

Figure 4:
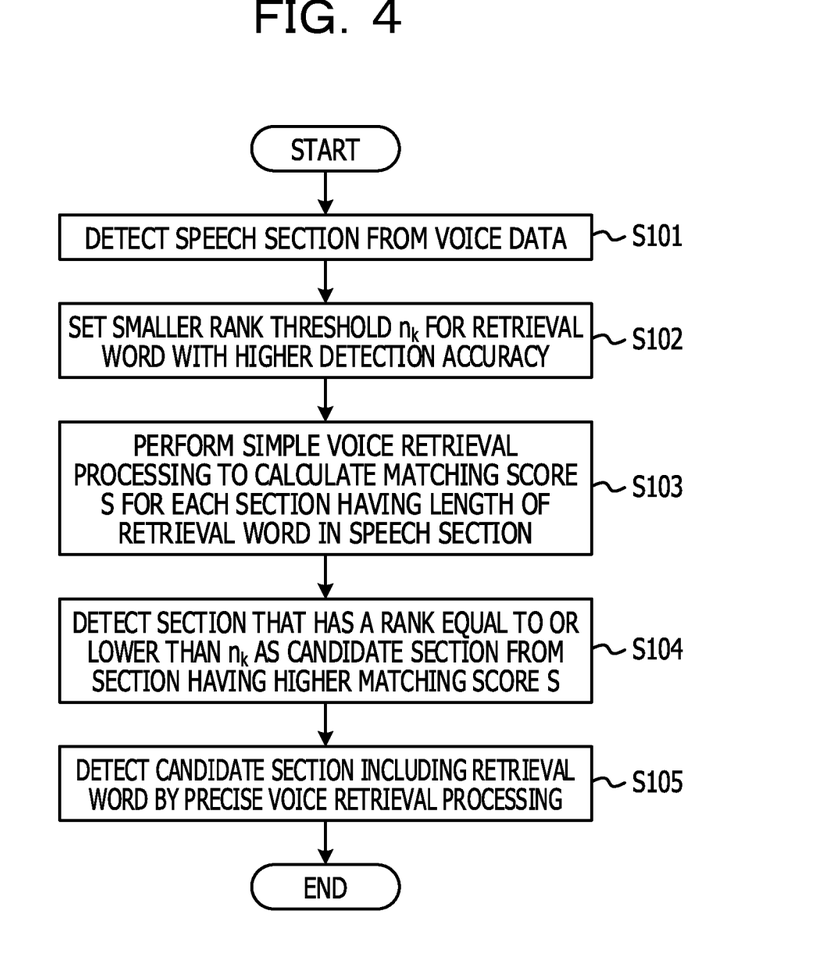
FIG. 4 is an operation flowchart of voice retrieval processing according to the first embodiment.

FIG. 4 is an operation flowchart of voice retrieval processing according to the first embodiment.

The speech section detection section 11 detects a speech section in which any of the speakers speaks from voice data to be targeted for retrieval (Step S101). Meanwhile, the threshold setting section 12 sets a rank threshold $n_k$ such that the higher the detection accuracy of a retrieval word specified through the user interface unit 6, the smaller the rank threshold $n_k$, based on a characteristic of the retrieval word (Step S102).

The simple matching section 13 performs simple voice retrieval processing for each of sections having the length of the retrieval word, which are included in each speech section detected from the voice data, to calculate a matching score S that is higher with a higher possibility of including the retrieval word (Step S103). Then, the simple matching section 13 detects a section that has a rank equal to or lower than the rank threshold $n_k$ as the candidate section that possibly includes the retrieval word, sequentially from the section having a higher matching score S (Step S104).

The precise matching section 14 performs precise voice retrieval processing for each candidate section to determine whether or not the retrieval word is included therein (Step S105). Then, the precise matching section 14 terminates the voice retrieval processing after outputting information indicating the candidate section determined to include the retrieval word. Note that Steps S101 and S102 may switch places with each other in the processing order.

As described above, the voice retrieval device configures the settings, based on the characteristic of the retrieval word, such that detection criteria for the candidate section by the simple matching section become stricter for a retrieval word with higher retrieval accuracy. On the other hand, the voice retrieval device configures the settings such that the detection criteria for the candidate section by the simple matching section become laxer for a retrieval word with lower retrieval accuracy. Accordingly, the voice retrieval device detects more candidate sections when there are many sections in which application of the precise voice retrieval processing is desired, and detects less candidate sections when there are few sections in which application of the precise voice retrieval processing is desired. Thus, the voice retrieval device may reduce the throughput which may be desired to detect the retrieval word while suppressing reduction in detection accuracy for the retrieval word included in the voice data. Furthermore, the voice retrieval device detects the candidate section from only the speech section estimated to be the one in which the speaker speaks. Accordingly, the voice retrieval device may also shorten the section in which the processing by the simple matching section is executed, and thus may further reduce the throughput which may be desired to detect the retrieval word.

Next, a voice retrieval device according to a second embodiment is described. The voice retrieval device according to the second embodiment determines a rank threshold based on an appearance probability of a retrieval word.

The voice retrieval device according to the second embodiment is different from the voice retrieval device according to the first embodiment only in the processing by the threshold setting section 12 in the processing unit 7. Therefore, the threshold setting section 12 and a part pertinent thereto are described below.

In this embodiment, the threshold setting section 12 obtains an appearance probability of a retrieval word by referring to an appearance probability database recording an appearance probability of each word prestored in the storage unit 5. For example, the threshold setting section 12 detects a word that matches text data of a retrieval word specified through the user interface unit 6 from among the words registered in the appearance probability database, and sets an appearance probability corresponding to the detected word as the appearance probability of the retrieval word. Note that the appearance probability is represented by a value within a range of 0 to 1, for example. When the retrieval word includes more than one word, the threshold setting section 12 may obtain the appearance probability for each of the words included in the retrieval word by referring to the appearance probability database, and set the minimum value of the appearance probability as the appearance probability of the retrieval word. Alternatively, the threshold setting section 12 may set the product of the appearance probabilities of the words included in the retrieval word, as the appearance probability of the retrieval word.

Generally, the lower the appearance probability of a word, the smaller the number of the words appearing in the voice data. On the other hand, the higher the appearance probability of a word, the larger the number of the words appearing in the voice data. Therefore, in this embodiment, the threshold setting section 12 reduces the number of candidate sections by setting stricter detection criteria for the retrieval word having a lower appearance probability, that is, by reducing the rank threshold. Thus, the number of the candidate sections to be processed by the precise matching section 14 is reduced. As a result, the throughput of the entire voice retrieval processing is reduced. Moreover, even when there are few candidate sections as described above, the lower appearance probability of the retrieval word decreases the possibility that the section including the retrieval word falls out of the candidate section.

Meanwhile, the threshold setting section 12 raises the rank threshold for a retrieval word having a higher appearance probability to increase the number of candidate sections, and thereby reduces the possibility that the section including the retrieval word falls out of the candidate section.

For example, the threshold setting section 12 sets a rank threshold $n_w$ according to the following equation.

$$n_w = N \times f_{freq}(w) \quad (4)$$

Here, w is the appearance probability. N is a constant, which is set to a large value if target voice data is long. For example, N is set to a value equal to 1/10 of the total number of words included in the target voice data. $f_{freq}(w)$ is a monotonically increasing function to output a large value if the appearance probability w is large and to set the output value within a range of 0 to 1. $f_{freq}(w)$ is expressed as the following equations. However, $f_{freq}(w)$ may be a non-linear monotonically increasing function such as a quadratic function, a cubic function or an exponential function.

$$f_{freq}(w) = 1.0 \quad \text{if } w > 0.1 \quad (5)$$
$$f_{freq}(w) = 0.5 \quad \text{else if } w < 0.01$$
$$f_{freq}(w) = \frac{4 + 50 \times w}{9} \quad \text{else if } 0.01 \leq w \leq 0.1$$

Alternatively, the threshold setting section 12 may calculate the rank threshold $n_k$ by subtracting a value obtained by a monotonically decreasing function, in which the larger the appearance probability w, the smaller the output value, from the constant N.

According to this embodiment, the voice retrieval device detects more candidate sections when the appearance probability of the retrieval word is higher. Thus, the voice retrieval device may suppress the failure to detect the retrieval word since the retrieval word is not included in the candidate section. Moreover, the voice retrieval device according to this embodiment reduces the number of the candidate sections when the appearance probability of the retrieval word is low. Thus, the voice retrieval device may reduce the throughput of the voice retrieval processing.

Next, a voice retrieval device according to a third embodiment is described. The voice retrieval device according to the third embodiment determines a score threshold that is a threshold for a matching score, based on a pronunciation difficulty of a retrieval word.

The voice retrieval device according to the third embodiment is different from the voice retrieval device according to the first embodiment in the processing by the threshold setting section 12 and the simple matching section 13 in the processing unit 7. Therefore, the threshold setting section 12, the simple matching section 13 and a part pertinent thereto are described below.

In this embodiment, the threshold setting section 12 obtains a pronunciation difficulty of a retrieval word by referring to a pronunciation difficulty database recording a pronunciation difficulty of each word prestored in the storage unit 5. For example, the threshold setting section 12 detects a word that matches text data of a retrieval word specified through the user interface unit 6 from among the words registered in the pronunciation difficulty database, and sets a pronunciation difficulty corresponding to the detected word as the pronunciation difficulty of the retrieval word. Note that the pronunciation difficulty is expressed as the ratio of the number of difficult pronunciation points to the number of syllables of the word. The pronunciation difficulty has a value within a range of 0 to 1, for example. When the retrieval word includes more than one word, the threshold setting section 12 may obtain the pronunciation difficulty for each of the words included in the retrieval word by referring to the pronunciation difficulty database, and set the maximum value thereof as the pronunciation difficulty of the retrieval word. Alternatively, the threshold setting section 12 may set the average value of the pronunciation difficulties of the words included in the retrieval word, as the pronunciation difficulty of the retrieval word.

Alternatively, the threshold setting section 12 conducts a language analysis on the retrieval word to obtain a syllable string of the retrieval word, and counts the number of difficult pronunciation points from a sequence of syllables included in the syllable string. Then, the threshold setting section 12 may obtain the pronunciation difficulty by dividing the total number of the difficult pronunciation points by the number of syllables in the retrieval word. Note that, when the total number of the difficult pronunciation points is larger than the number of the syllables in the retrieval word, the threshold setting section 12 sets the pronunciation difficulty to 1.

The difficult pronunciation points include, for example, a point having more than one contracted sound within n syllables and a point having more than one syllable with the same or similar consonant within m syllables. Note that m and n are integers equal to or larger than 2, respectively. Assuming, for example, that m=n=2 as to a Japanese word "Shujutsu", the Japanese characters "Shu" and "Ju" are contracted sounds and are similar to each other. Therefore, the word includes one point related to the contracted sound and one point related to the same or similar consonant. The number of syllables of the word "Shujutsu" is 3. Therefore, the pronunciation difficulty is (1+1)/3=0.67.

Note that, as the difficult pronunciation points, the threshold setting section 12 may count points other than those described above. Also, the threshold setting section 12 may calculate the pronunciation difficulty by setting different weights depending on the kind of contracted sound or consonant in the difficult pronunciation point and by dividing the total weight of the difficult pronunciation point detected in the retrieval word by the number of syllables in the retrieval word.

Generally, the lower the pronunciation difficulty of a word, the more accurately the speaker may pronounce the word. Thus, the lower the pronunciation difficulty of the retrieval word, the higher the matching score of the section including the retrieval word in the voice data. On the other hand, the higher the pronunciation difficulty of the retrieval word, the lower the matching score of the section tends to be, even if the section is the one including the retrieval word in the voice data. Therefore, it is estimated that the lower the pronunciation difficulty of the retrieval word, the higher the detection accuracy of the retrieval word. Accordingly, in this embodiment, the threshold setting section 12 increases the score threshold that is the threshold for the matching score for the retrieval word having lower pronunciation difficulty. Thus, when the pronunciation difficulty of the retrieval word is low, the number of candidate sections to be processed by the precise matching section 14 is reduced. As a result, the throughput of the entire voice retrieval processing is reduced. Meanwhile, the threshold setting section 12 may detect the section including the retrieval word as the candidate section, even if the retrieval word is not correctly pronounced, by lowering the score threshold for the retrieval word having higher pronunciation difficulty.

For example, the threshold setting section 12 sets a score threshold $x_p$ according to the following equation.

$$x_p = X \times f_{pd}(p) \tag{6}$$

Here, p is the pronunciation difficulty. X is a constant, which is set to a value obtained by multiplying the maximum value that may be taken by the matching score, for example, by 0.8 to 0.9. In this embodiment, for example, since the maximum value that may be taken by the matching score is 100, X is set to 90. $f_{pd}(p)$ is a monotonically decreasing function to output a small value if the pronunciation difficulty p is high and to set the output value within a range of 0 to 1. $f_{pd}(p)$ is expressed as the following equations. However, $f_{pd}(p)$ may be a non-linear monotonically decreasing function such as a quadratic function, a cubic function or an exponential function.

$$f_{pd}(p)=0.8 \text{ if } p>0.9$$

$$f_{pd}(p)=1.0 \text{ else if } p<0.5$$

$$f_{pd}(p)=1.25-p\times0.5 \text{ else if } 0.5 \le p \le 0.9 \tag{7}$$

Alternatively, the threshold setting section 12 may calculate the score threshold $x_p$ by subtracting a value obtained by a monotonically increasing function, in which the higher the pronunciation difficulty p, the larger the output value, from the constant X.

The threshold setting section 12 notifies the simple matching section 13 of the score threshold $x_p$.

As in the case of the simple matching section in the first embodiment, the simple matching section 13 calculates the matching score S for each of the sections having the same length as that of the retrieval word within the speech section in the voice data. Then, the simple matching section 13 detects a section having the matching score S equal to or higher than the score threshold $x_p$, as the candidate section.

Figure 5:
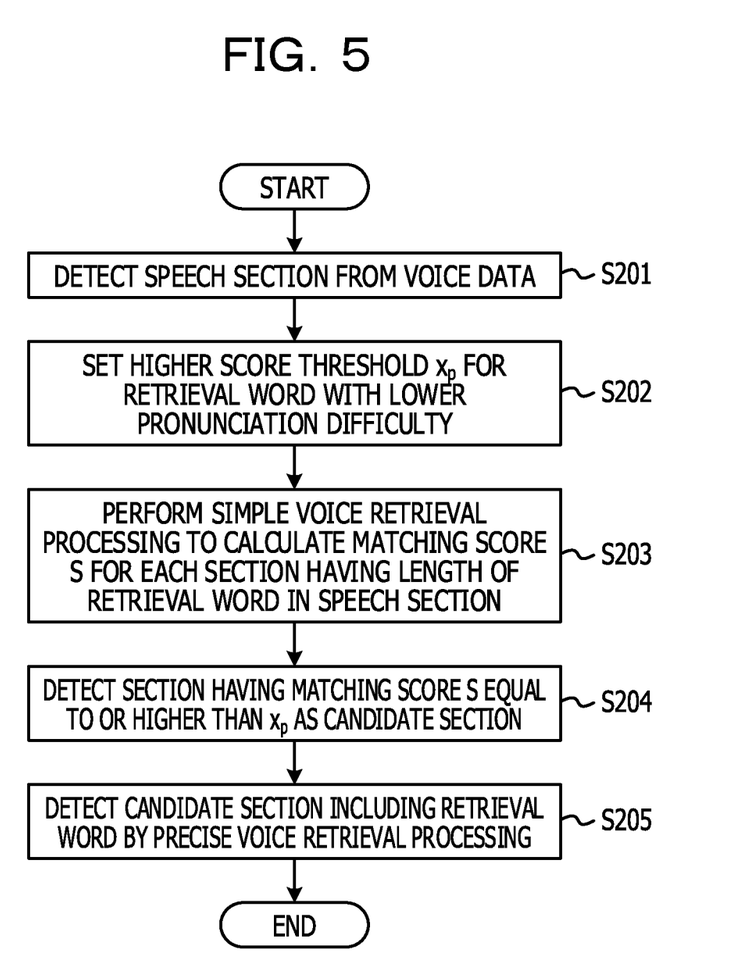
FIG. 5 is an operation flowchart of voice retrieval processing according to a third embodiment.

FIG. 5 is an operation flowchart of voice retrieval processing according to the third embodiment.

The speech section detection section 11 detects a speech section in which any of the speakers speaks from voice data to be targeted for retrieval (Step S201). Meanwhile, the threshold setting section 12 sets a score threshold $x_p$ such that the lower the pronunciation difficulty of a retrieval word specified through the user interface unit 6, the higher the score threshold $x_p$, based on the pronunciation difficulty of the retrieval word (Step S202).

The simple matching section 13 performs simple voice retrieval processing for each of sections having the same length as that of the retrieval word, which are included in each speech section detected from the voice data, to calculate a matching score S that is higher with a higher possibility of including the retrieval word (Step S203). Then, the simple matching section 13 detects a section having the matching score S equal to or higher than the score threshold $x_p$ as the candidate section that possibly includes the retrieval word (Step S204).

The precise matching section 14 performs precise voice retrieval processing for each candidate section to determine whether or not the retrieval word is included therein (Step S205). Then, the precise matching section 14 terminates the voice retrieval processing after outputting the section determined to include the retrieval word. Note that Steps S201 and S202 may switch places with each other in the processing order.

According to this embodiment, the voice retrieval device sets stricter detection criteria of the candidate section for the retrieval word having lower pronunciation difficulty. Thus, the voice retrieval device may reduce the throughput of the voice retrieval processing by reducing the number of candidate sections for the retrieval word that may be correctly pronounced by the speaker. Moreover, the voice retrieval device according to this embodiment sets laxer detection criteria of the candidate section for the retrieval word having higher pronunciation difficulty. Thus, the voice retrieval device may suppress the failure that the section including the retrieval word falls out of the candidate section.

Next, a voice retrieval device according to a fourth embodiment is described. The voice retrieval device according to the fourth embodiment determines a rank threshold based on the number of moras contained in a retrieval word and an appearance probability, and also determines a score threshold based on a pronunciation difficulty of the retrieval word. Then, the voice retrieval device uses both of the rank threshold and the score threshold to detect a candidate section.

The voice retrieval device according to the fourth embodiment is different from the voice retrieval device according to the first embodiment in the processing by the threshold setting section 12 and the simple matching section 13 in the processing unit 7. Therefore, the threshold setting section 12, the simple matching section 13 and a part pertinent thereto are described below.

The threshold setting section 12 performs the same processing as that performed by the threshold setting section in the voice retrieval device according to the first embodiment to obtain the number of moras k contained in a retrieval word. Also, the threshold setting section 12 performs the same processing as that performed by the threshold setting section in the voice retrieval device according to the second embodiment to obtain an appearance probability w of the retrieval word. Then, the threshold setting section 12 determines a rank threshold $N_{k,w}$ according to the following equation, for example, based on the number of moras k and the appearance probability w.

$$n_{k,w}=N \times f_{mora}(k) \times f_{freq}(w) \tag{8}$$

Note that $f_{mora}(k)$ may be a monotonically decreasing function to output a small value if the number of moras k is increased, and is expressed as the equations (2), for example. Meanwhile, $f_{freq}(w)$ may be a monotonically increasing function to output a large value if the appearance probability w is increased, and is expressed as the equations (5).

Furthermore, the threshold setting section 12 performs the same processing as that performed by the threshold setting section in the voice retrieval device according to the third embodiment to determine a score threshold $x_p$ such that the higher the pronunciation difficulty of the retrieval word, the lower the score threshold $x_p$.

The threshold setting section 12 notifies the simple matching section 13 of the rank threshold $N_{k,w}$ and the score threshold $x_p$.

The simple matching section 13 uses both of the rank threshold $N_{k,w}$ and the score threshold $x_p$ to detect a candidate section.

For example, as in the case of the simple matching section in the first embodiment, the simple matching section 13 calculates a matching score S for each of sections having the same length as that of the retrieval word within the speech section in the voice data. Then, the simple matching section 13 detects a section which has the matching score S equal to or higher than the score threshold $x_p$ and whose number is equal to or smaller than $N_{k,w}$, sequentially from the section having a high matching score, as the candidate section.

Alternatively, the simple matching section 13 may detect a section which has the matching score S equal to or higher than the score threshold $x_p$ or whose number is equal to or smaller than $N_{k,w}$, sequentially from the section having the high matching score S, as the candidate section.

Alternatively, the simple matching section 13 detects a section having the matching score S equal to or higher than a score threshold ($\alpha x_p$) as the candidate section. Moreover, the simple matching section 13 detects a section whose number is equal to or smaller than ($\beta N_{k,w}$), sequentially from the section having the high matching score S, as the candidate section. Furthermore, the simple matching section 13 may detect a section which has the matching score S equal to or higher than the score threshold $x_p$ or whose number is equal to or smaller than $N_{k,w}$, sequentially from the section having a high matching score, as the candidate section. Note that $\alpha$ and $\beta$ are constants, which are set to 1.1 to 1.2 and 0.8 to 0.9, respectively, for example.

Figure 6:
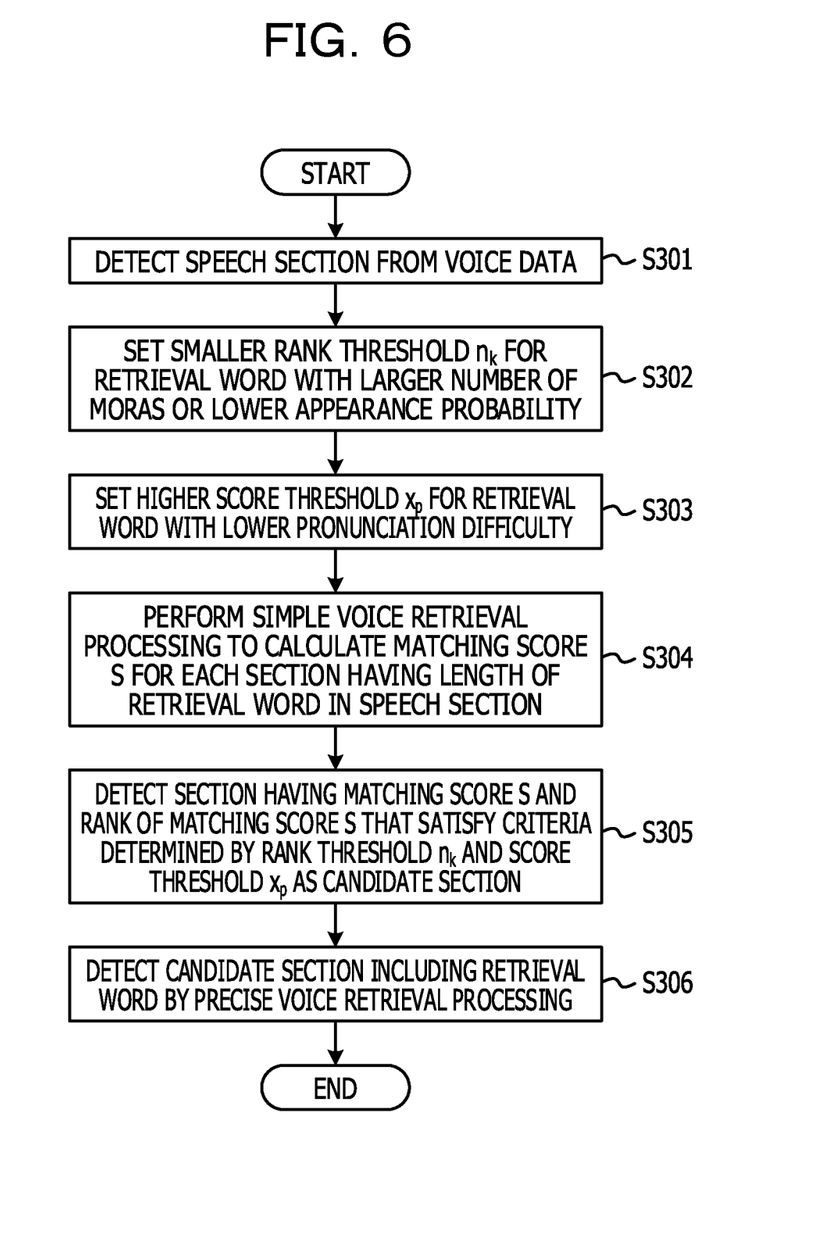
FIG. 6 is an operation flowchart of voice retrieval processing according to a fourth embodiment.

FIG. 6 is an operation flowchart of voice retrieval processing according to the fourth embodiment.

The speech section detection section 11 detects a speech section in which any of the speakers speaks from voice data to be targeted for retrieval (Step S301). Meanwhile, the threshold setting section 12 sets a rank threshold $n_k$ such that the larger the number of moras contained in a retrieval word specified through the user interface unit 6 or the lower the appearance probability of the retrieval word, the smaller the rank threshold $n_k$ (Step S302). Furthermore, the threshold setting section 12 sets a score threshold $x_p$ such that the lower the pronunciation difficulty of the retrieval word, the higher the score threshold $x_p$ (Step S303).

The simple matching section 13 performs simple voice retrieval processing for each of sections having the same length as that of the retrieval word, which are included in each speech section detected from the voice data, to calculate a matching score S that is higher with a higher possibility of including the retrieval word (Step S304). Then, the simple matching section 13 detects a section in which the matching score S and the rank of the matching score S satisfy criteria determined by the rank threshold $n_k$ and the score threshold $x_p$, as the candidate section that possibly includes the retrieval word (Step S305).

The precise matching section 14 performs precise voice retrieval processing for each candidate section to determine whether or not the retrieval word is included therein (Step S306). Then, the precise matching section 14 terminates the voice retrieval processing after outputting information indicating the candidate section determined to include the retrieval word. Note that Steps S301 to S303 may switch places with each other in the processing order.

According to this embodiment, the voice retrieval device sets the detection criteria for the candidate section based on a plurality of the characteristics of the retrieval word. Thus, the voice retrieval device may set more proper detection criteria than those set based on only one characteristic.

Note that, according to a modified example, the threshold setting section 12 may determine a score threshold based on the number of moras or an appearance probability of a retrieval word. In this case, the threshold setting section 12 increases the score threshold for a retrieval word having a larger number of moras. Alternatively, the threshold setting section may increase the score threshold for a retrieval word having a lower appearance probability. Furthermore, the threshold setting section 12 may determine a rank threshold based on a pronunciation difficulty of a retrieval word. In this case, the threshold setting section 12 lowers the rank threshold for a retrieval word having a lower pronunciation difficulty.

According to another modified example, the speech section detection section 11 may be omitted. In this case, the simple matching section 13 may execute processing performed by the simple matching section 13 for the entire voice data to be targeted for retrieval.

According to still another modified example, a retrieval word may be inputted as voice data through the microphone, for example. In this case, the processing unit 7 acquires text data of the retrieval word by executing voice recognition processing, for example, on the voice data of the retrieval word. Then, the processing unit 7 may use the text data to detect a section including the retrieval word within the voice data according to any of the embodiments or modified examples described above.

A computer program that causes a computer to realize respective functions of a processing unit in a status estimation device according to any of the embodiments or modified examples described above may be provided as being recorded in a computer-readable medium, such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A voice retrieval device comprising:
a memory; and
a processor coupled to the memory and configured to:
set detection criteria to detect a retrieval word, based on a characteristic of the retrieval word, such that the higher the detection accuracy of the retrieval word or the lower the pronunciation difficulty of the retrieval word or the lower the appearance probability of the retrieval word, the less number of sections to be selected, as candidate sections, from voice data including a plurality of sections obtained by dividing the voice data into a plurality of frames, the voice data being recorded using a microphone;
select part of the plurality of sections as the candidate sections which possibly include the retrieval word by performing first voice retrieval processing on the voice data according to the detection criteria, the first voice retrieval processing including calculating a matching score using the detection criteria for each of the plurality of sections included in the voice data, the matching score indicating a possibility of the retrieval word being included in each of the plurality of sections, according to the first voice retrieval processing, and detecting sections having the matching score that satisfies the detection criteria as the candidate sections;
detect a section including the retrieval word by performing second voice retrieval processing using the detection criteria on each of the selected candidate sections, the second voice retrieval processing being different from the first voice retrieval processing; and output the detected section which includes the retrieval word.

2. The device according to claim 1,
wherein throughput of the first voice retrieval processing is lower than that of the second voice retrieval processing.

3. The device according to claim 1,
wherein the processor is configured to set the detection criteria by calculating the number of moras contained in the retrieval word as the characteristic of the retrieval word, such that the larger the number of moras, the less number of sections to be selected as the candidate sections.

4. The device according to claim 1,
wherein the processor is configured to set the detection criteria by calculating an appearance probability of the retrieval word as the characteristic of the retrieval word, such that the lower the appearance probability, the less number of sections to be selected as the candidate sections.

5. The device according to claim 1,
wherein the detection criteria is a rank threshold for the order of ranks from a higher matching score,
wherein the processor is configured to
set lower rank threshold for the detection criteria such that the less number of sections to be selected as the candidate sections, and
detect a section that has a rank equal to or lower than the rank threshold, as the candidate section, among the plurality of sections.

6. The device according to claim 1,
wherein the detection criteria is a score threshold for the matching score,
wherein the processor is configured to
increase the score threshold for the detection criteria such that the less number of sections to be selected as the candidate sections, and
detect a section that has the corresponding matching score equal to or higher than the score threshold, as the candidate section, among the plurality of sections.

7. The device according to claim 1,
wherein the detection criteria is a rank threshold for the order of ranks from a higher matching score and a score threshold for the matching score,
wherein the processor is configured to
lower the rank threshold and increase the score threshold for the detection criteria such that the less number of sections to be selected as the candidate sections, and
detect a section that has the corresponding matching score equal to or higher than the score threshold and has a rank equal to or lower than the rank threshold, as the candidate section, among the plurality of sections.

8. The device according to claim 1,
wherein the detection criteria is a rank threshold for the order of ranks from a higher matching score and a score threshold for the matching score,
wherein the processor is configured to
lower the rank threshold and increase the score threshold for the detection criteria such that the less number of sections to be selected as the candidate sections, and
detect a section that has the corresponding matching score equal to or higher than the score threshold or has a rank equal to or lower than the rank threshold, as the candidate section, among the sections.

9. The device according to claim 1, wherein the processor is further configured to
input the retrieval word used for the first voice retrieval processing.

10. A voice retrieval method comprising:
setting detection criteria to detect a retrieval word, based on a characteristic of the retrieval word, such that the higher the detection accuracy of the retrieval word or the lower the pronunciation difficulty of the retrieval word or the lower the appearance probability of the retrieval word, the less number of sections to be selected, as candidate sections, from voice data including a plurality of sections obtained by dividing the voice data into a plurality of frames, the voice data being recorded using a microphone;
selecting part of the plurality of sections as the candidate sections which possibly include the retrieval word by performing, by a computer processor, first voice retrieval processing on the voice data according to the detection criteria, the first voice retrieval processing including calculating a matching score using the detection criteria for each of the plurality of sections included in the voice data, the matching score indicating a possibility of the retrieval word being included in each of the plurality of sections, according to the first voice retrieval processing, and detecting sections having the matching score that satisfies the detection criteria as the candidate sections;
detecting a section including the retrieval word by performing second voice retrieval processing using the detection criteria on each of the selected candidate sections, the second voice retrieval processing being different from the first voice retrieval processing; and
outputting the detected section which includes the retrieval word.

11. The method according to claim 10,
wherein throughput of the first voice retrieval processing is lower than that of the second voice retrieval processing.

12. The method according to claim 10,
wherein the setting includes calculating the number of moras contained in the retrieval word as the characteristic of the retrieval word, such that the larger the number of moras, the less number of sections to be selected as the candidate sections.

13. The method according to claim 10,
wherein the setting includes calculating an appearance probability of the retrieval word as the characteristic of the retrieval word, such that the lower the appearance probability, the less number of sections to be selected as the candidate sections.

14. The method according to claim 10,
wherein the detection criteria is a rank threshold for the order of ranks from a higher matching score,
wherein the setting includes setting lower rank threshold for the detection criteria such that the less number of sections to be selected as the candidate sections, and
wherein the detecting includes detecting a section that has a rank equal to or lower than the rank threshold, as the candidate section, among the plurality of sections.

15. The method according to claim 10,
wherein the detection criteria is a score threshold for the matching score,
wherein the setting includes increasing the score threshold for the detection criteria such that the less number of sections to be selected as the candidate sections, and
wherein the detecting includes detecting a section that has the corresponding matching score equal to or higher than the score threshold, as the candidate section, among the plurality of sections.

16. The method according to claim 10,
wherein the detection criteria is a rank threshold for the order of ranks from a higher matching score and a score threshold for the matching score,
wherein the setting includes lowering the rank threshold and increasing the score threshold for the detection criteria such that the less number of sections to be selected as the candidate sections, and
wherein the detecting includes detecting a section that has the corresponding matching score equal to or higher than the score threshold and has a rank equal to or lower than the rank threshold, as the candidate section, among the plurality of sections.

17. The method according to claim 10,
wherein the detection criteria is a rank threshold for the order of ranks from a higher matching score and a score threshold for the matching score,
wherein the setting includes lowering the rank threshold and increasing the score threshold for the detection criteria such that the less number of sections to be selected as the candidate sections, and
wherein the detecting includes detecting a section that has the corresponding matching score equal to or higher than the score threshold or has a rank equal to or lower than the rank threshold, as the candidate section, among the sections.

18. A non-transitory computer-readable storage medium storing a voice retrieval program that causes a computer to execute a process comprising:

setting detection criteria to detect a retrieval word, based on a characteristic of the retrieval word, such that the higher the detection accuracy of the retrieval word or the lower the pronunciation difficulty of the retrieval word or the lower the appearance probability of the retrieval word, the less number of sections to be selected, as candidate sections, from voice data including a plurality of sections obtained by dividing the voice data into a plurality of frames, the voice data being recorded using a microphone;

selecting part of the plurality of sections as the candidate sections which possibly include the retrieval word by performing first voice retrieval processing on the voice data according to the detection criteria, the first voice retrieval processing including calculating a matching score using the detection criteria for each of the plurality of sections included in the voice data, the matching score indicating a possibility of the retrieval word being included in each of the plurality of sections, according to the first voice retrieval processing, and detecting sections having the matching score that satisfies the detection criteria as the candidate sections;

detecting a section including the retrieval word by performing second voice retrieval processing using the detection criteria on each of the selected candidate sections, the second voice retrieval processing being different from the first voice retrieval processing; and outputting the detected section which includes the retrieval word.

\* \* \* \* \*